(12) United States Patent
Meehan

(10) Patent No.: US 8,563,159 B2
(45) Date of Patent: Oct. 22, 2013

(54) STRUCTURE AND METHOD FOR REMOVING BATTERY CELL HEAT

(75) Inventor: Henry M. Meehan, Suffern, NY (US)

(73) Assignee: Bren-Tronics Batteries International, L.L.C., Commack, NY (US)

(*) Notice: Subject to any disclaimer, the term of this patent is extended or adjusted under 35 U.S.C. 154(b) by 92 days.

(21) Appl. No.: 12/850,102

(22) Filed: Aug. 4, 2010

(65) Prior Publication Data
US 2012/0034499 A1 Feb. 9, 2012

(51) Int. Cl.
*H01M 2/24* (2006.01)
*H01M 10/50* (2006.01)

(52) U.S. Cl.
USPC .......... 429/158; 429/159; 429/160; 429/120; 429/7

(58) Field of Classification Search
USPC ............ 429/158, 160, 7, 120, 123, 121, 163, 429/159; 439/755, 754, 627, 504
See application file for complete search history.

(56) References Cited

U.S. PATENT DOCUMENTS

| | | | |
|---|---|---|---|
| 2,278,986 A * | 4/1942 | Gibbs | 439/504 |
| 2,552,405 A * | 5/1951 | Chapman | 429/161 |
| 2,739,997 A * | 3/1956 | Carrick et al. | 429/81 |
| 3,148,322 A | 9/1964 | Booe et al. | |
| 3,378,736 A | 4/1968 | Vale et al. | |
| 3,537,907 A | 11/1970 | Wilson | |
| 5,545,491 A | 8/1996 | Farley | |
| 5,558,950 A | 9/1996 | Ovshinsky et al. | |
| 5,800,942 A | 9/1998 | Hamada et al. | |
| 6,013,388 A | 1/2000 | Stadnick et al. | |
| 6,146,778 A | 11/2000 | Rouillard et al. | |
| 6,479,185 B1 | 11/2002 | Hilderbrand et al. | |
| 6,641,942 B1 | 11/2003 | Rouillard et al. | |
| 6,773,301 B1 | 8/2004 | Chaskin | |
| 6,797,018 B2 | 9/2004 | Rouillard et al. | |
| 7,531,270 B2 | 5/2009 | Buck et al. | |
| 2006/0110657 A1 | 5/2006 | Stanton et al. | |
| 2007/0020513 A1 | 1/2007 | Medina et al. | |
| 2007/0239221 A1 * | 10/2007 | Kast et al. | 607/36 |
| 2009/0111009 A1 | 4/2009 | Goesmann et al. | |
| 2009/0297892 A1 | 12/2009 | Ijaz et al. | |
| 2010/0104935 A1 | 4/2010 | Hermann et al. | |

FOREIGN PATENT DOCUMENTS

DE 3518216 * 11/1986
DE 3803321 * 7/1989

* cited by examiner

*Primary Examiner* — Raymond Alejandro
(74) *Attorney, Agent, or Firm* — Keusey & Associates, P.C.

(57) ABSTRACT

An apparatus includes a thermal strap that connects a first terminal of a first battery cell and a second terminal of a second battery cell. The thermal strap has high thermal and electrical conductivity. A wall link connects the thermal strap to a wall having high thermal conductivity. The wall link includes a first portion having high thermal and electrical conductivity and a second portion having high thermal conductivity but low electrical conductivity. The second portion is located between the first portion and the wall.

14 Claims, 5 Drawing Sheets

STRUCTURE AND METHOD FOR REMOVING BATTERY CELL HEAT

FIELD OF INVENTION

The present invention relates to a structure and method for removing heat generated in a battery cell.

BACKGROUND

Many higher power density batteries and battery cells are cooled by direct mechanical contact of their outer housings to a heat sink, heat sink surface, or liquid. In these situations, there may be inefficient transfer of the heat from the inside of the cell to the heat sink, as the cell structure is intrinsically a non-homogeneous laminated structure. The heat must also pass through the exterior of the cell housing. This situation is made worse if the cell housing material is a plastic, ceramic or laminate having poor thermal conductivity.

Current methods for heating and cooling of cells require significant space between cells and, in the case of liquid cooling, the cell enclosure materials need to have adequate properties if the system has a lengthy service life. As an example, the use of circulating liquid coolants requires ancillary equipment that has a service life much lower than the service life of the battery. Also, in the same circulating liquid method, the degradation of the cooling liquid characteristics and the corrosion resulting from the materials interaction reduces the service life of the system.

Accordingly, there is a need to develop a method to enhance the transfer of heat that is generated within the cell to an exterior of the cell of battery housing.

SUMMARY

Briefly, the present invention provides an apparatus comprising a thermal strap that connects a first terminal of a first battery cell and a second terminal of a second battery cell. The thermal strap has high thermal and electrical conductivity. A wall link connects the thermal strap to a wall having high thermal conductivity. The wall link includes a first portion having high thermal and electrical conductivity and a second portion having high thermal conductivity but low electrical conductivity. The second portion is located between the first portion and the wall.

The present invention further provides a battery comprising a battery housing having a wall. The wall has high thermal conductivity. A first cell is located within the battery housing and a second cell is adjacent the first cell within the battery housing. A thermal strap electrically couples the first cell and the second cell. A wall link connects the thermal strap to the wall. The wall link comprises a first portion having high thermal and electrical conductivity and a second portion having high thermal conductivity but low electrical conductivity. The second portion separates the first portion and the wall from each other.

Additionally, the present invention provides a method of dissipating heat from a battery comprising the steps of coupling an electrically and thermally conducting strap to terminal of a first battery cell and a terminal of a second battery cell; coupling the strap to a thermally conducting and non-electrically conducting member; coupling the thermally conducting and non-electrically member to a heat sink; transmitting electrical current from the first battery cell to the second battery cell through the strap; and transmitting heat generated in the first battery cell and the second battery cell through the strap and the member, to the heat sink.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings certain embodiments of the present invention. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE PREFERRED EMBODIMENTS

Figure 1:
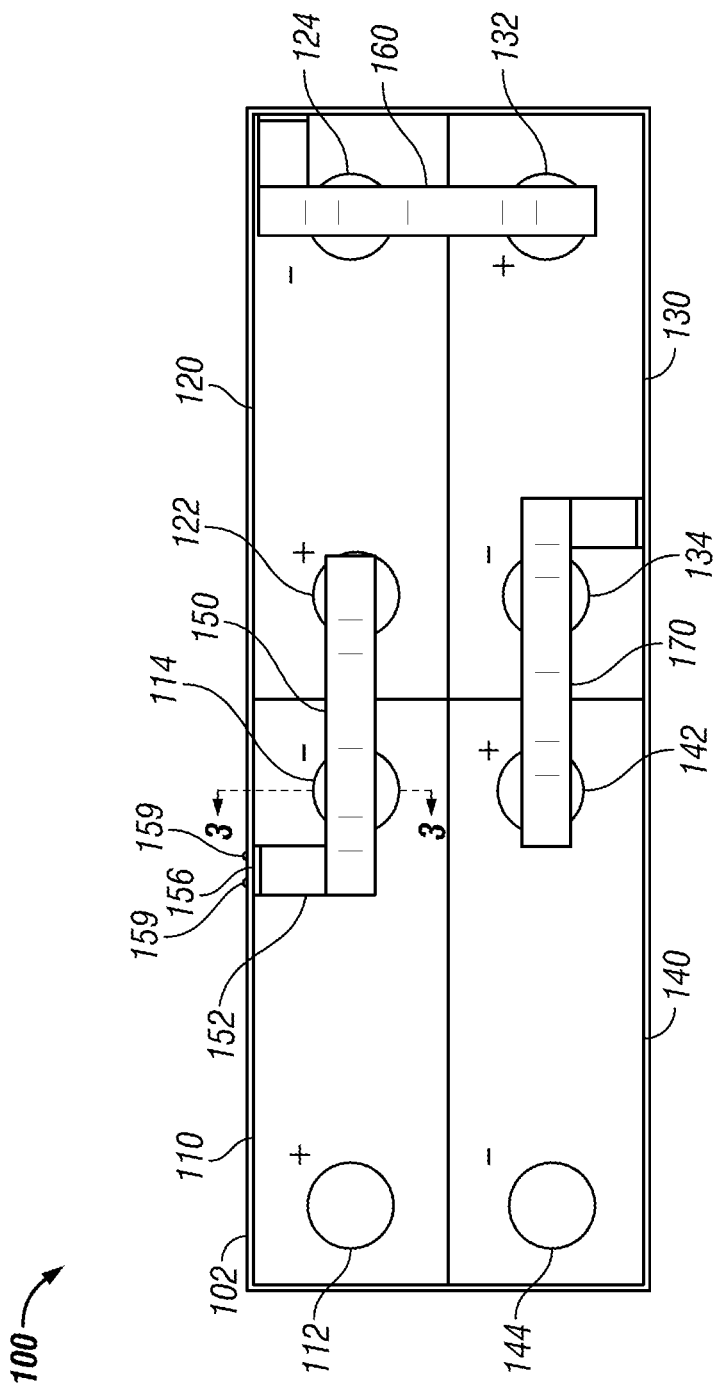
FIG. 1 is a top plan view of a battery incorporating a thermal strap according to an exemplary embodiment of the present invention.

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. It is understood that the drawings are not drawn exactly to scale. In the drawings, similar reference numbers are used for designating similar elements throughout the several figures.

The following describes particular embodiments of the present invention. As used herein, two devices are "electrically coupled" when electricity is able to pass between the two devices.

When a battery is electrically coupled to a load, heat is generated in each of the cells that make up the battery. The present invention removes the heat by thermo-mechanically connecting the cell current collectors and electrical terminals of the cells to a heat sink. The process of heat sinking the cell terminals provides a direct thermal path from internal cell components to the heat sink. Because of this shorter, more direct path than in the prior art, the efficiency of the heat sinking is greatly improved. This more efficient heat sinking of the cells results in lower cell temperatures, improved cell performance, and potentially extended cell life and does not increase the size of the cell.

Referring to FIG. 1, a battery 100 according to an exemplary embodiment of the present invention is shown. Battery 100 includes a plurality of battery cells (or "cells") 110, 120, 130, 140 electrically coupled together in series within a battery housing 102. In this embodiment, cells 110, 120, 130, 140 are large format prismatic lithium ion cells, such as those manufactured by International Battery, Inc. of Allentown, Pa., the assignee of the present invention. The present invention could be implemented in a wide variety of cell types. While four (4) cells 110, 120, 130, 140 are shown, those skilled in the art will recognize that more or less than four (4) cells may be used within the scope of the present invention.

Each cell 110, 120, 130, 140 has a positive terminal 112, 122, 132, 142, respectively, and a negative terminal 114, 124, 134, 144, respectively. Negative terminal 114 of cell 110 is electrically coupled to positive terminal 122 of cell 120 by a thermal strap 150 such that thermal strap 150 transmits electricity between first cell 110 and second cell 120 when first cell 110 and second cell 120 are under load.

Thermal strap 150 has a high thermal conductivity and high electrical conductivity. As used herein, the term "high thermal conductivity" is considered to be a value above about 1.2 Watts/meter-degree Kelvin (W/m-K) and the term "high electrical conductivity" is considered to be a value above about $10^6$ Siemens/meter (S/m). The term "low electrical conductivity" is considered to be a value below about 1 Siemen/meter (S/m). In an exemplary embodiment, thermal strap 150 may be constructed from copper. Copper has a thermal conductivity of between about 395 and about 405 W/m-K and an electrical conductivity of about $5.8 \times 10^7$ S/m.

Figure 2:
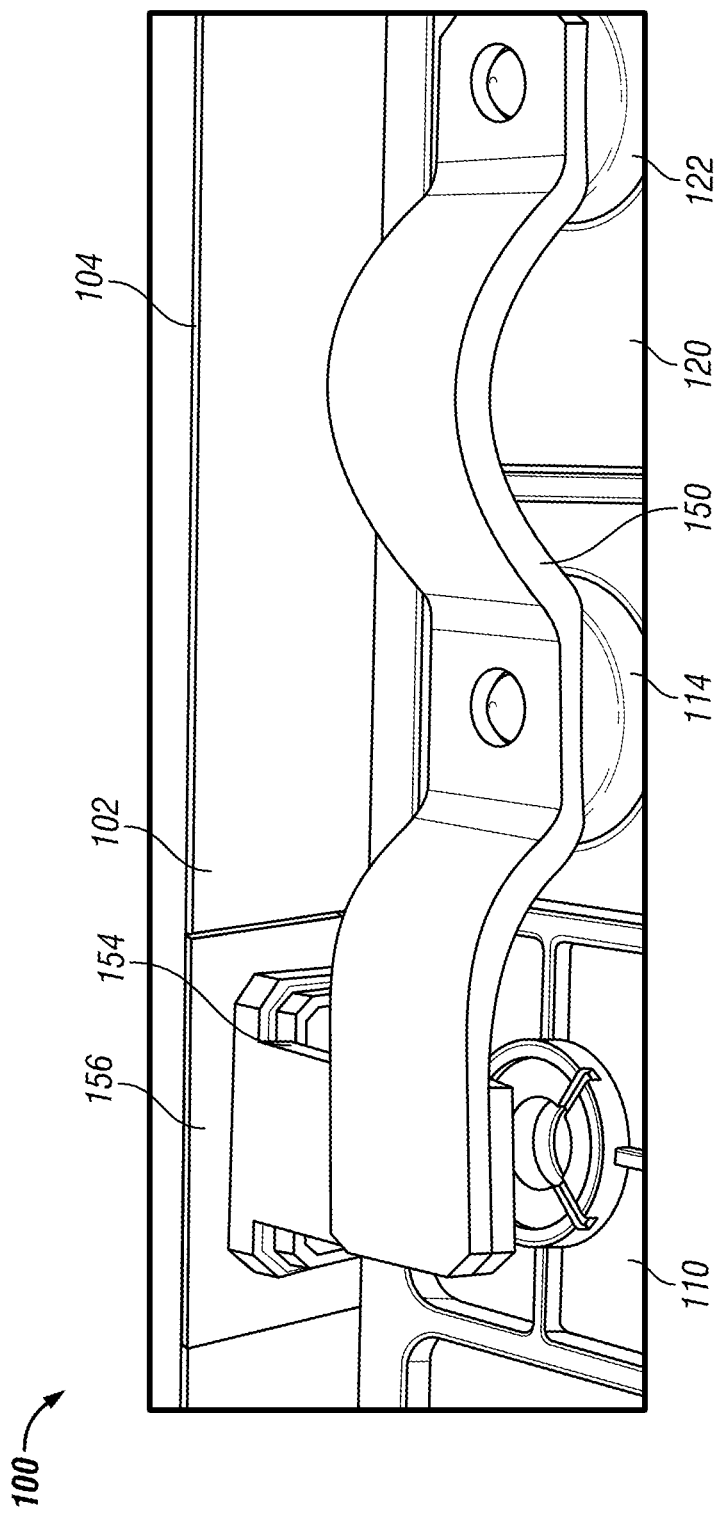
FIG. 2 is a perspective view of a thermal strap according to an exemplary embodiment of the present invention coupling two adjacent battery cells.
Figure 3:
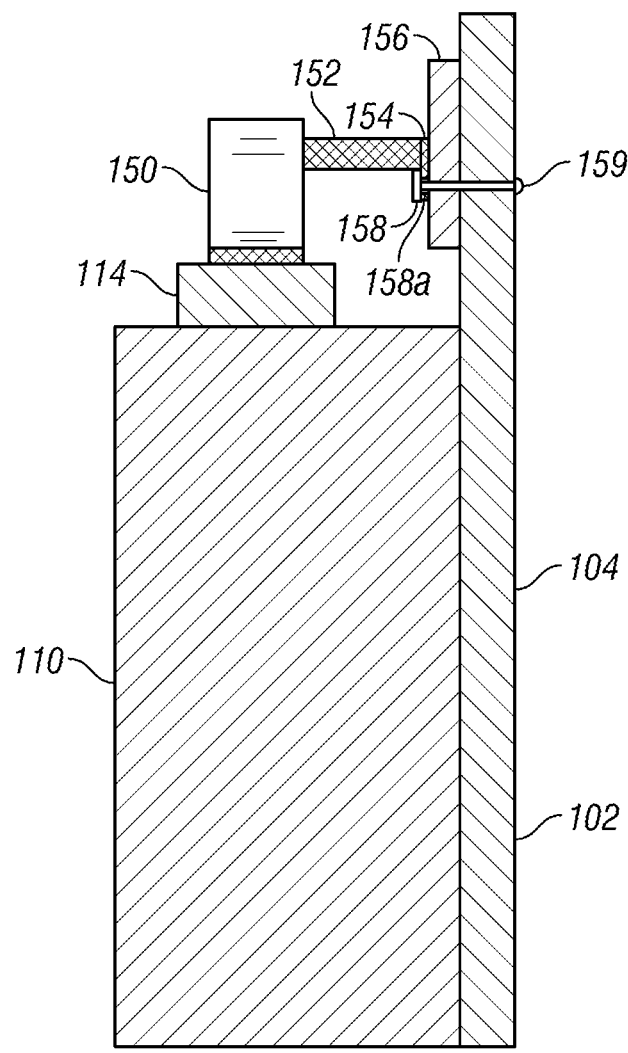
FIG. 3 is a sectional view of the thermal strap of FIG. 1, taken along lines 3-3 of FIG. 1.

Referring to FIGS. 2 and 3, a wall link 152 connects thermal strap 150 to a wall 104 of battery housing 102. Wall link 152 includes a first portion 154 having high thermal and electrical conductivity and a second portion 156 having high thermal conductivity but low electrical conductivity. In an exemplary embodiment, first portion 154 has an electrical conductivity at least $10^6$ times greater than second portion 156.

By way of example only, first portion 154 of wall link 152 may be constructed from copper or other suitable high thermal conducting and high electrical conducting material and second portion 156 of wall link 152 may be an electrical insulator, such as, for example, Sil-Pad K-10, manufactured by The Bergquist Company, located in Thief River Falls, Minn. Alternatively, second portion 156 may be Tgard™ 200 Insulating Material, manufactured by Laird Technologies, located in Chesterfield, Mo. Second portion 156 of wall link 152 has a thermal conductivity of about 1.3 W/m-K and an electrical conductivity about $10^{-12}$ S/m. In an exemplary embodiment, second portion 156 has a thickness of between about 0.152 millimeters (about 0.006 inch) and about 0.253 millimeters (about 0.010 inch), which is sufficient to allow heat transfer between first portion 154 and wall 104, but not allow high electrical conductivity between first portion 154 and wall 104.

First portion 154 is coupled to thermal strap 150 and second portion 156 is located between first portion 154 and wall 104, separating first portion 154 and wall 104 from each other. In an exemplary embodiment, thermal strap 150 and first portion 154 are both copper and are formed from a common unitary piece of copper. While FIGS. 1 and 2 show first portion 154 extending from an end of thermal strap 150, those skilled in the art will recognize that first portion 154 can extend from any portion of thermal strap 150, as long as first portion 154 is in physical contact with thermal strap 150.

Figure 4:
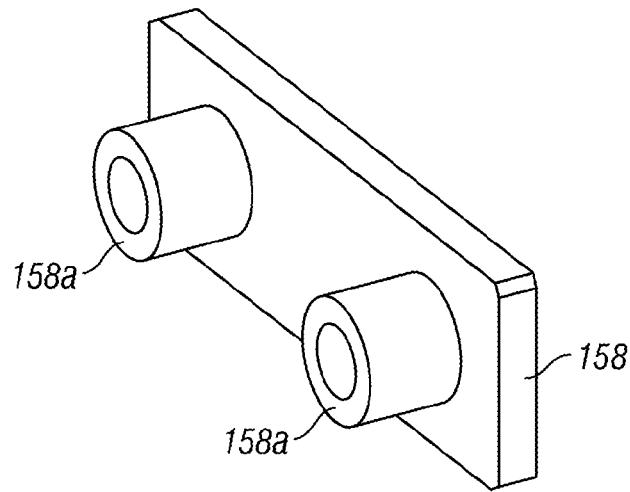
FIG. 4 is a perspective view of an exemplary connector that connects the thermal strap of FIG. 1 to a battery wall.
Figure 5:
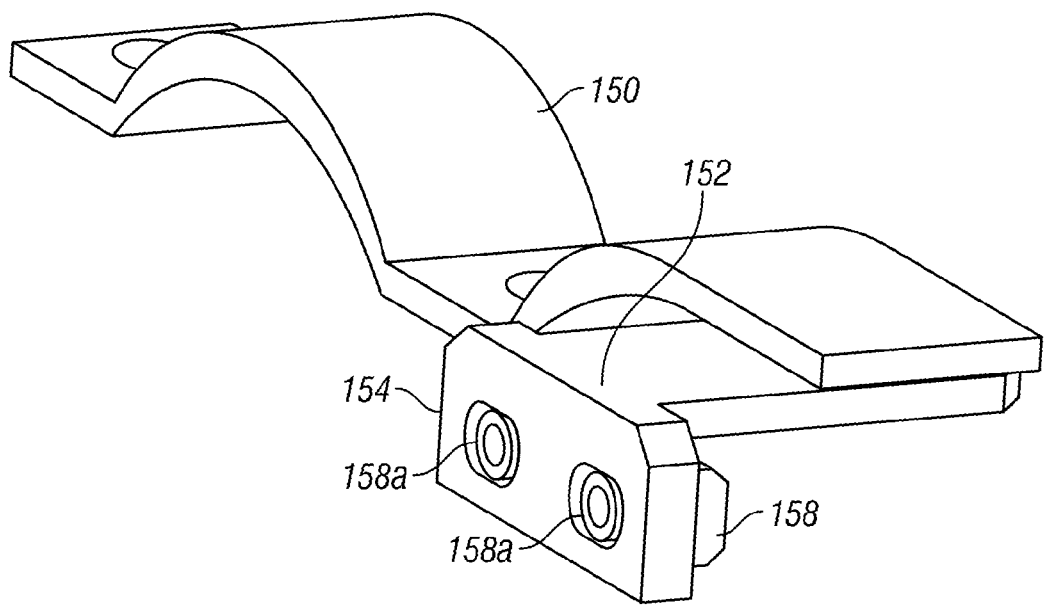
FIG. 5 is a perspective view the thermal strap of FIGS. 2 and 3 and the connector of FIG. 4.

A combination of an insulator plate 158 and a bolt 159 secures first portion 154 and second portion 156 of wall link 152 to wall 104. At least insulator plate 158 is constructed from a low- or non-electrically conducting material so as not to conduct electricity from first portion 154 to wall 104. As shown in FIGS. 4 and 5, insulator plate 158 includes a pair of bosses 158a that extend through openings in first portion 154 (shown in FIG. 5) and second portion 156 (not shown). Bosses 158a are threaded to allow bolts 159 to be threadingly secured to bosses 158a to secure first portion 154 and second portion 156 of wall link 152 to wall 104, as shown in FIG. 3.

Thermal strap 150 and wall link 152 are sized to transmit at least 800 amps of electrical current therethrough for at least 30 seconds with less than about a 2 degree Celsius rise in temperature of thermal strap 150 and to transmit at least 40 amps of electrical current therethrough at a steady state of 65 degrees Celsius, with less than about a 2 degree Celsius rise in the temperature of thermal strap 150. Exemplary dimensions of thermal strap 150 are 22.5 mm wide and 3.2 mm thick. Exemplary dimensions of first portion 154 of wall link 152 are 22.5 mm wide and 3.75 mm thick.

Wall 104 has high thermal conductivity. In an exemplary embodiment, wall 104 is constructed from aluminum, which has a thermal conductivity of between about 235 and about 255 W/m-K. Aluminum also has a high electrical conductivity, which makes it important to electrically isolate wall 104 from first portion 154 of wall link 152 by second portion 156 of wall link 152. Wall 104 provides containment and protection for cells 110, 120, 130, 140 and has a sufficient thickness to function as an effective heat sink for battery 100.

Alternatively, wall 104 may be constructed from a material that has high thermal conductivity but low electrical conductivity, such as, for example, CoolPoly polymers, manufactured by Cool Polymers, Inc., located in Warwick, R.I. If such a high thermal conductivity but low electrical conductivity material is used, second portion 156 of wall link 152 may be omitted.

As further shown in FIG. 1, negative terminal 124 of cell 120 is electrically coupled to positive terminal 132 of cell 130 by a thermal strap 160 and negative terminal 134 of cell 130 is electrically coupled to positive terminal 142 of cell 140 by a thermal strap 170. Thermal straps 160, 170 may be the same design and material as thermal strap 150 and are connected to wall 104 in the same manner as thermal strap 150 described above. Thermal straps 160, 170 aid in further drawing heat from cells 120, 130, 140, thus further reducing the overall temperature inside battery 100.

Figure 6:
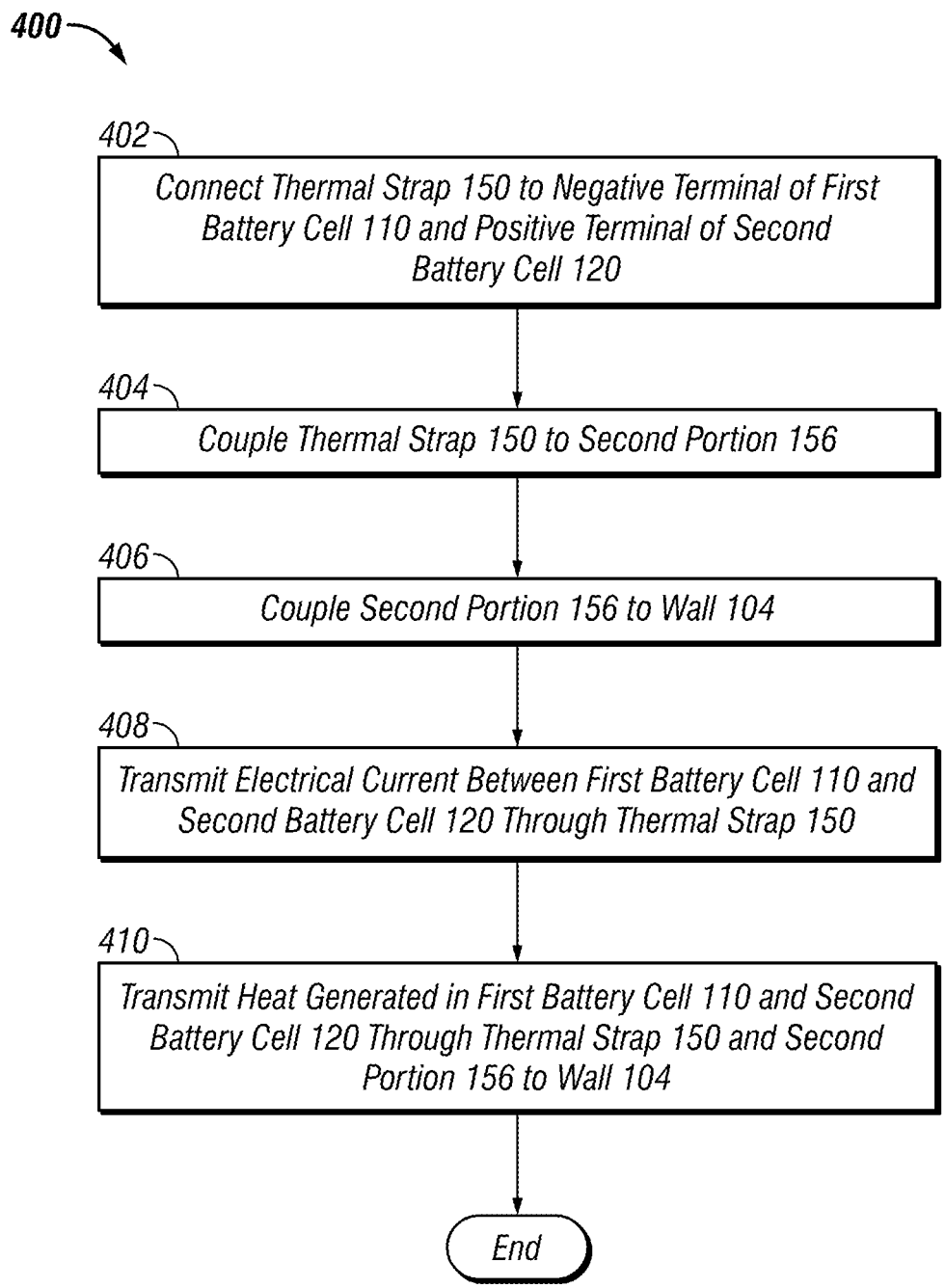
FIG. 6 is a flowchart illustrating an exemplary method of dissipating heat generated in a battery using the present invention.

An exemplary method of dissipating heat from battery 100 is illustrated in flowchart 400 shown in FIG. 6. In step 402, thermal strap 150 is connected to negative terminal 114 of first battery cell 110 and positive terminal 122 of second battery cell 120. In step 404, thermal strap 150 is coupled to thermally conducting and non-electrically conducting second portion 156. In step 406, thermally conducting and non-electrically conducting second portion 156 is coupled to wall 104, which acts as a heat sink. In step 408, electrical current is transmitted between first battery cell 110 and second battery cell 120 through thermal strap 150. In step 410, heat that is generated in first battery cell 110 and second battery cell 120 is transmitted through thermal strap 150 and second portion 156, to wall 104.

While the principles of the invention have been described above in connection with preferred embodiments, it is to be clearly understood that this description is made only by way of example and not as a limitation of the scope of the invention.

What is claimed is:

1. A battery comprising:
  a battery housing having a wall made from a thermal conductive metal material comprising a heat sink for the battery;
  a first prismatic cell having a first positive terminal and a first negative terminal located within the battery housing;

a second prismatic cell having a second positive terminal and a second negative terminal adjacent the first cell within the battery housing;

a terminal strap electrically coupling the first positive terminal to the second negative terminal for transmitting electricity between the cells when the cells are under load; and a wall link extending from the terminal strap thermo-mechanically connecting the coupled terminals to the wall for heat sinking, the wall link comprising a first portion connected to the terminal strap and a second portion connected between the first portion and the wall, wherein the second portion has an electrical conductivity at least $10^6$ times less than the first portion to electrically isolate the first portion from the wall.

2. The battery of claim 1, wherein the terminal strap and the first portion are formed from a unitary piece of material.

3. The battery of claim 1, wherein the first portion of the wall link has an electrical conductivity of at least about $10^6$ Siemens per meter.

4. The battery of claim 1, wherein the first portion of the wall link has a thermal conductivity of at least about 1.2 Watts per meter-degree Kelvin.

5. The battery of claim 1, wherein the second portion of the wall link has an electrical conductivity of less than about 1 Siemen per meter.

6. The battery of claim 1, wherein the second portion of the wall link has a thermal conductivity of at least about 1.2 Watts per meter-degree Kelvin.

7. The battery of claim 1, wherein the cells are prismatic lithium-ion cells.

8. The battery of claim 1, wherein under load the terminal strap transmits up to 800 amps of electrical current therethrough for at least 30 seconds with less than about a 2 degree Celsius rise in the temperature of the thermal terminal strap.

9. The battery of claim 1, wherein under load the terminal strap transmits up to 40 amps of electrical current therethrough at a steady state of 65 degrees Celsius, with less than about a 2 degree Celsius rise in the temperature of the terminal strap.

10. The battery of claim 3, wherein the second portion of the wall link has an electrical conductivity of less than about 1 Siemen per meter and a thermal conductivity of at least about 1.2 Watts per meter-degree Kelvin.

11. A battery comprising:

a battery housing having a wall comprising a heat sink for the battery, the wall having a thermal conductivity of above about 1.2 Watts per meter-degree Kelvin and an electrical conductivity of less than about 1 Siemen per meter;

a terminal strap electrically coupling a first positive terminal of a first prismatic cell to a second negative terminal of a second prismatic cell for transmitting electricity between the cells within the battery housing when the cells are under load; and a wall link extending from the terminal strap thermo-mechanically connecting the coupled terminals to the wall for heat sinking, the wall link comprising a first portion connected to the terminal strap and a second portion connected between the first portion and the wall, wherein the second portion has an electrical conductivity at least $10^6$ times less than the first portion to electrically isolate the first portion from the wall, the wall link having a thermal conductivity of above about 1.2 Watts per meter-degree Kelvin.

12. The battery of claim 11, wherein the terminal strap and the wall link are formed from a unitary piece of material.

13. The battery of claim 11, wherein under load the terminal strap transmits up to 800 amps of electrical current therethrough for at least 30 seconds with less than about a 2 degree Celsius rise in the temperature of the terminal strap.

14. The battery of claim 11, wherein under load the terminal strap transmits up to 40 amps of electrical current therethrough at a steady state of 65 degrees Celsius, with less than about a 2 degree Celsius rise in the temperature of the terminal strap.

* * * * *

UNITED STATES PATENT AND TRADEMARK OFFICE
CERTIFICATE OF CORRECTION

PATENT NO. : 8,563,159 B2  
APPLICATION NO. : 12/850102  
DATED : October 22, 2013  
INVENTOR(S) : Henry M. Meehan Page 1 of 1

It is certified that error appears in the above-identified patent and that said Letters Patent is hereby corrected as shown below:

In the Claims

Column 5, line 35 (claim 8, line 4) before "terminal" delete "thermal."

Signed and Sealed this  
Tenth Day of December, 2013

Margaret A. Focarino  
*Commissioner for Patents of the United States Patent and Trademark Office*